US008464157B2

(12) United States Patent
Hyatt et al.

(10) Patent No.: US 8,464,157 B2
(45) Date of Patent: *Jun. 11, 2013

(54) SMART BROWSING PROVIDERS

(75) Inventors: David Hyatt, Mountain View, CA (US); Ramanathan Guha, Los Altos, CA (US)

(73) Assignee: New Aurora Corporation, Mountain View, CA (US)

( * ) Notice: Subject to any disclaimer, the term of this patent is extended or adjusted under 35 U.S.C. 154(b) by 615 days.

This patent is subject to a terminal disclaimer.

(21) Appl. No.: 12/023,352

(22) Filed: Jan. 31, 2008

(65) Prior Publication Data
US 2008/0189618 A1 Aug. 7, 2008

Related U.S. Application Data

(63) Continuation of application No. 09/208,805, filed on Dec. 9, 1998, now Pat. No. 7,328,405.

(51) Int. Cl.
*G06F 3/00* (2006.01)

(52) U.S. Cl.
USPC ............................. 715/738; 715/744; 715/760

(58) Field of Classification Search
USPC ................. 715/205, 207, 208, 234, 255, 744, 715/745, 738, 735, 733, 760, 764
See application file for complete search history.

(56) References Cited

U.S. PATENT DOCUMENTS

| 4,706,121 A | 11/1987 | Young |
| 5,115,501 A | 5/1992 | Kerr |
| 5,253,066 A | 10/1993 | Vogel |
| 5,341,293 A | 8/1994 | Vertelney et al. |
| 5,347,628 A | 9/1994 | Brewer et al. |
| 5,442,788 A | 8/1995 | Bier |
| 5,479,268 A | 12/1995 | Young et al. |
| 5,533,184 A | 7/1996 | Malcolm |
| 5,551,037 A | 8/1996 | Fowler et al. |
| 5,553,233 A | 9/1996 | Ikeda |
| 5,596,702 A | 1/1997 | Stucka et al. |

(Continued)

FOREIGN PATENT DOCUMENTS

| WO | WO 97/34388 | 9/1977 |
| WO | WO 98/45793 | 10/1998 |

OTHER PUBLICATIONS

"Alexa Internet and Netscape Team to Provide Related Sites to Support Smart Browsing," http://www.alexa.com, printed Oct. 1, 1998, 11 pages.

(Continued)

*Primary Examiner* — Thu Huynh
(74) *Attorney, Agent, or Firm* — Keller Jolley Preece

(57) ABSTRACT

A web browser program is for execution by a client computer connectable to a plurality of server computers via a computer network. The web browser program automatically reconfigures chrome of a user interface to the web browser program to provide a user access to any one of a plurality of groups of related information. A content display program module is configured to receive content data from a current server computer that is one of the plurality of server computers. The content display program module causes a display, on a content portion of the a display of the client computer, that corresponds to the content data. A chrome display program module is configured to cause a display of chrome on a chrome portion of the client computer display that corresponds to chrome specifiers in a chrome configuration database.

18 Claims, 3 Drawing Sheets

U.S. PATENT DOCUMENTS

| | | | |
|---|---|---|---|
| 5,600,776 A | 2/1997 | Johnson et al. | |
| 5,625,783 A | 4/1997 | Ezekiel et al. | |
| 5,664,739 A | 9/1997 | Black et al. | |
| 5,678,041 A | 10/1997 | Baker et al. | |
| 5,696,898 A | 12/1997 | Baker et al. | |
| 5,706,458 A * | 1/1998 | Koppolu | 715/810 |
| 5,745,109 A | 4/1998 | Nakano et al. | |
| 5,761,662 A | 6/1998 | Dasan | |
| 5,764,906 A | 6/1998 | Edelstein et al. | |
| 5,796,393 A | 8/1998 | MacNaughton et al. | |
| 5,801,701 A * | 9/1998 | Koppolu et al. | 715/821 |
| 5,809,204 A | 9/1998 | Young et al. | |
| 5,818,446 A | 10/1998 | Bertram et al. | |
| 5,845,300 A | 12/1998 | Comer et al. | |
| 5,857,190 A * | 1/1999 | Brown | 1/1 |
| 5,880,730 A | 3/1999 | Durand | |
| 5,914,714 A | 6/1999 | Brown | |
| 5,937,163 A | 8/1999 | Lee et al. | |
| 5,941,954 A | 8/1999 | Kalajan | |
| 5,956,029 A | 9/1999 | Okada et al. | |
| 5,959,630 A | 9/1999 | Takeuchi et al. | |
| 5,960,411 A | 9/1999 | Hartman et al. | |
| 5,966,533 A | 10/1999 | Moody | |
| 5,978,799 A | 11/1999 | Hirsch | |
| 5,987,611 A | 11/1999 | Freund | |
| 5,991,807 A | 11/1999 | Schmidt et al. | |
| 6,005,566 A | 12/1999 | Jones et al. | |
| 6,014,638 A | 1/2000 | Burge et al. | |
| 6,057,836 A | 5/2000 | Kavalam et al. | |
| 6,065,047 A | 5/2000 | Carpenter et al. | |
| 6,069,628 A | 5/2000 | Farry et al. | |
| 6,072,486 A | 6/2000 | Sheldon et al. | |
| 6,075,528 A | 6/2000 | Curtis | |
| 6,091,411 A | 7/2000 | Straub et al. | |
| 6,097,389 A | 8/2000 | Morris et al. | |
| 6,104,334 A | 8/2000 | Allport | |
| 6,112,212 A | 8/2000 | Heitler | |
| 6,128,635 A * | 10/2000 | Ikeno | 715/246 |
| 6,128,663 A * | 10/2000 | Thomas | 709/228 |
| 6,133,915 A | 10/2000 | Arcuri et al. | |
| 6,138,162 A | 10/2000 | Pistriotto et al. | |
| 6,141,010 A | 10/2000 | Hoyle | |
| 6,173,269 B1 | 1/2001 | Solokl et al. | |
| 6,188,401 B1 | 2/2001 | Peyer | |
| 6,211,871 B1 | 4/2001 | Himmel et al. | |
| 6,252,591 B1 | 6/2001 | Dockweiler et al. | |
| 6,256,032 B1 | 7/2001 | Hugh | |
| 6,256,739 B1 | 7/2001 | Skopp et al. | |
| 6,266,681 B1 | 7/2001 | Guthrie | |
| 6,282,548 B1 | 8/2001 | Burner et al. | |
| 6,297,819 B1 | 10/2001 | Furst | |
| 6,396,515 B1 | 5/2002 | Hetherington et al. | |
| 6,401,094 B1 | 6/2002 | Stemp et al. | |
| 6,421,669 B1 | 7/2002 | Gilmour et al. | |
| 6,438,125 B1 | 8/2002 | Brothers | |
| 6,456,307 B1 | 9/2002 | Bates et al. | |
| 6,490,602 B1 | 12/2002 | Kraemer | |
| 6,564,243 B1 | 5/2003 | Yedidia et al. | |
| 6,623,527 B1 | 9/2003 | Hamzy | |
| 6,628,314 B1 | 9/2003 | Hoyle | |
| 2002/0186255 A1 | 12/2002 | Shafron et al. | |

OTHER PUBLICATIONS

"Alexa 3.0 Delivers More Useful and Dynamic Information with customizable Interface", Nov. 23, 1998, http://www.alexa.com/press/press_releases/alexa_30_release.html, pp. 1-2.

"Web Surfing Gets Down to Business with Alexa 3.0", Oct. 7, 1998, http://www.alexa.com/press/press_releases/alexa_30.html, pp. 1-2.

"Ad on the Bar" Compaign Supplements Alexa's Focused Advertising Program, Dec. 10, 1997, http://www.alexa.com/press_releases/ad.html, pp. 1-3.

Eric Miller, "An Introduction to the Resource Description Framework", D-Lib Magazine, May 1998, p. 1-12.

Brown et al., "Using Netscape 2", copyright 1995 by Que Corporation, p. 74.

* cited by examiner

SMART BROWSING PROVIDERS

CROSS-REFERENCE TO RELATED APPLICATIONS

This application is a continuation application of U.S. patent application Ser. No. 09/208,805, filed Dec. 9, 1998, now U.S. Pat. No. 7,328,405, and titled "Smart Browsing Providers," which is incorporated herein by reference in its entirety.

TECHNICAL FIELD

The present invention relates to providing "related information" to users as they browse the world wide web and, in particular, to giving such users "related information" from a variety of different sources, where a designation of the particular sources is dynamically reconfigurable.

BACKGROUND

The internet (also known as the "world wide web", or simply "the web") is a vast global computer network that has lately become exceedingly popular. A typical user of the internet accesses "web pages" via a browser program executing on that user's computer—a "client computer"—by typing the address of the web page into a location area of the browser's user interface. Web page addresses are in the form of universal resource locators, or URL's. For example, the web page of Netscape Communications Corporation may be accessed by the user typing in the URL for the Netscape website into the location area of the browser's user interface. A major drawback of the internet is that untrustworthy information is sometimes (and very easily) published via the internet, and users have no quick and reliable way to distinguish trustworthy information from untrustworthy information.

One way to determine the reliability of information on one site of the internet is to view other "related" sites to see what these other sites say about the same subject matter. Alexa Internet of San Francisco, Calif., provides a software product that integrates with a browser to present such related information to the user. The Alexa software product determines which sites to list as related information by performing link and text analysis of a large number of web pages to determine similarities between a page being viewed and other pages; by studying patterns of web use; and from user suggestions. A significant disadvantage of the Alexa approach is that, once a browser is initially configured to interact with the Alexa service, the user only enjoys one point of view, that determined by Alexa Internet, as to what is related information.

What is desired is a browser that allows a user to easily enjoy multiple competing points of view as to what is "related information". Furthermore, it is desired that whether the browser presents one or multiple points of view, that the user can easily choose which point(s) of view are presented.

SUMMARY

A web browser program is for execution by a client computer connectable to a plurality of server computers via a computer network. In general, the web browser program automatically reconfigures chrome of a user interface to the web browser program to provide a user access to any one of a plurality of groups of related information.

A content display program receives content data from a current server computer that is one of the plurality of server computers. The content display program displays, on a content portion of the display of the client computer, that corresponds to the content data.

A chrome display program displays chrome, on a chrome portion of the client computer display, that corresponds to chrome specifiers in a chrome configuration database.

A current site communication program provides an indication of the current server computer to a plurality of "related information" servers indicated by a "related information" servers indication. This indication may be, for example, a "universal resource locator" or keywords used by the browser program to index to a site to display.

A chrome configuration processing program receives from the plurality of "related information" servers, "related information" designators. These "related information" designators are provided to the client computer based on the indication of the current server computer. The chrome configuration processing program provides the "related information" designators as chrome specifiers in the chrome configuration database. As a result, the chrome display program displays the "related site" designators as part of the chrome.

A "related information" servers indication receiving program receives the "related information" servers indication from at least one of the plurality of server computers such that the "related information" servers indication is dynamically reconfigurable.

By providing "related information" from multiple sites, multiple competing points of view can be provided to the user. Furthermore, by making the definition of the sites that provide the "related information" dynamically reconfigurable, the reliability of the "related information" provided is further enhanced.

BRIEF DESCRIPTION OF FIGURES

FIG. 3 further illustrates how the browser is configured to display, as part of the chrome portion of the display, "related information" that is related to content currently being displayed in the content portion of the display, and how an indication of the servers providing the "related information" is dynamically configurable.

DETAILED DESCRIPTION

Figure 1:
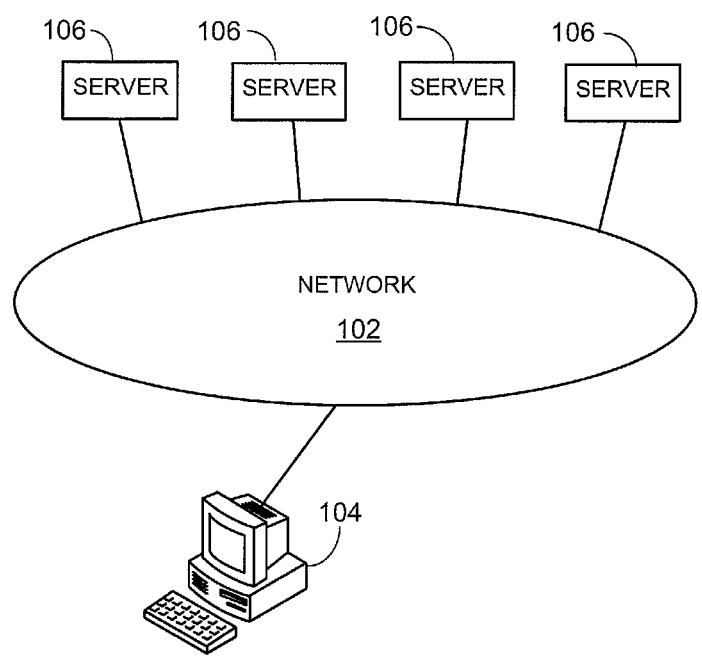
FIG. 1 illustrates, in a very basic form, the topology of a computer network, such as the internet.
Figure 2:
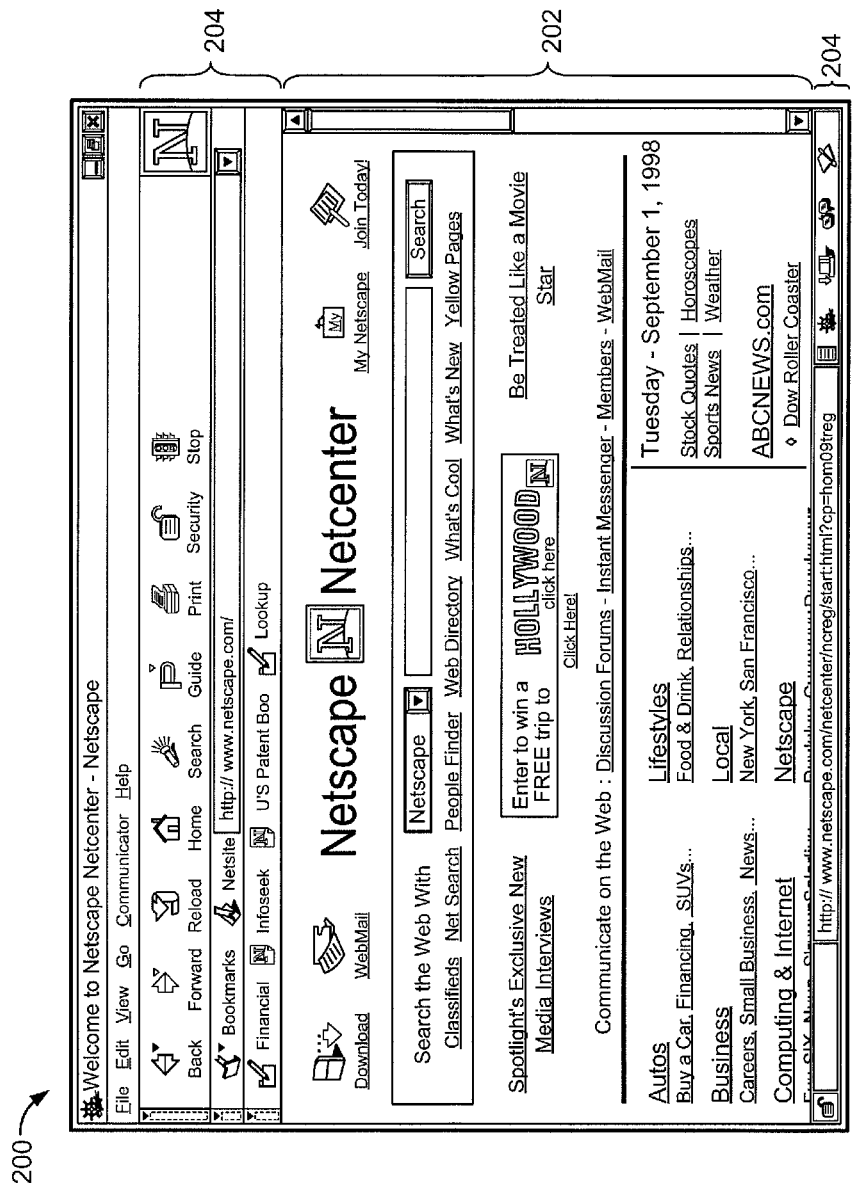
FIG. 2 illustrates a browser display, including a content portion and a chrome portion.
Figure 3:
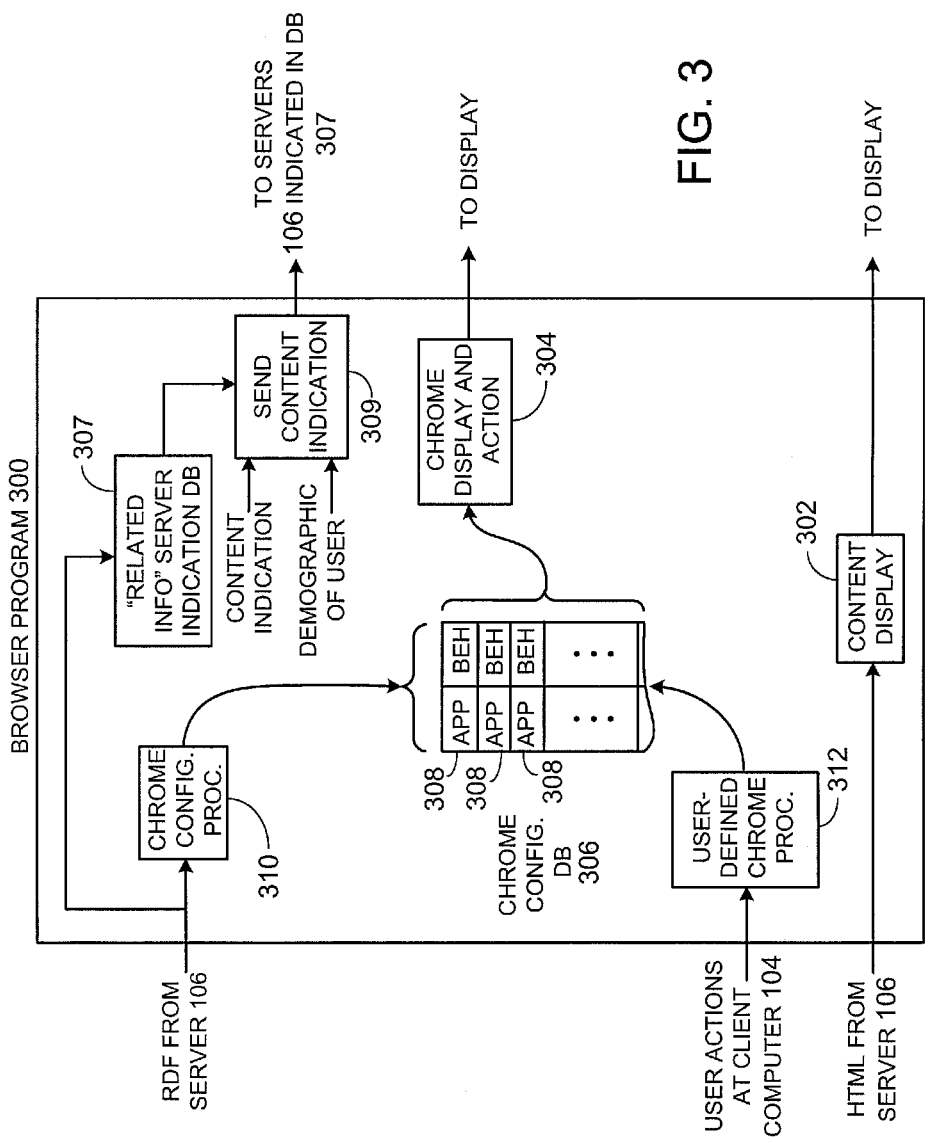
FIG. 3 illustrates, in block form, a browser program configured to cause the display of the content portion and the chrome portion, and for handling a user interface to the chrome portion.

In accordance with an embodiment of the present invention, a browser program is configured to execute on a client computer. Referring to FIG. 1, the client computer 104 is connected to a network 102 (e.g., the internet) and is configured to receive data from a server computer 106 that is also connected to the network 102. Reference is now made to FIGS. 2 and 3 in addition to FIG. 1. In operation, the browser program 300 includes a content display program 302 that operates on HTML (hypertext markup language) data received from the server computer 106 via the network 102 to cause content to be displayed on a content portion 202 of a browser window 200 on the display of the client computer 104.

In addition, the browser program 300 also includes a chrome display and action program 304 that causes chrome to be displayed on a chrome portion 204 of the display of the client computer 104. The chrome display and action program 304 also processes actions based on user input to the chrome portion 204 of the display of the client computer 104. Both the chrome display and chrome action processing is responsive to the contents of a chrome configuration database 306.

Specifically, the chrome configuration database 306 includes chrome specification records (designated in FIG. 3 by the reference numeral 308) containing chrome specifiers that specify both the appearance of each portion of the chrome and the behavior associated with activation of that portion of the chrome. Activation may occur in one of a number of ways, such as "clicking" on the portion, pulling down a menu from the portion (where the appearance and behavior of the menu pulled down is also in the chrome specification records), or even moving a cursor across the portion. In one embodiment, the behavior is specified as a JavaScript file that, when executed, performs the behavior.

The chrome specification information may originate either from the server computer 106, or may be based on user actions. In one embodiment, chrome specification information that originates from the server computer 106 is in the form of Resource Description Framework (RDF) language. RDF is a schema being considered, but not yet adopted, by the World Wide Web Consortium (W3C) to model web resources and their interrelationships. At the time of filing this patent application, RDF is only defined in "working draft" form. A copy of the latest working draft, dated Aug. 14, 1998, is available via the world wide web at w3.org/TR1998/WD-rdf-schema.19980814, and is hereby incorporated by reference in its entirety. The newest version is always available at w3.org/TR/WD-rdf-schema. If the chrome specification information originates from the server computer 106, then it is processed by a chrome configuration process 310 and the records 308 of the chrome configuration database 306 are modified accordingly. By contrast, if the chrome specification information originates from user actions, then it is processed by a user-defined chrome process 312. User actions to specify chrome, at least in some limited fashion, is known in the art. For example, the Communicator 4.0 browser of Netscape Communications Corporation allows for manipulating a tree structure of bookmarks, by, for example, dragging a link into a personal toolbar folder to cause the browser to display the links on a personal toolbar portion of the browser's chrome. See *Official Netscape Communication 4 Professional Edition Book*, by Phil James and Tara Calishain (Ventana Communications Group 1997). By contrast to Netscape Communicator 4.0, however, in the described embodiment, user actions would be manipulating a representation of the chrome specification records 308 in the chrome configuration database 306. Either or both of the processes 310, 312 may be employed to modify the records 308 of the chrome configuration database 306.

The operation of the browser program 300 is now discussed in greater detail relative to the chrome configuration. In one embodiment, the browser program 300 is configured such that, upon installation, connection is automatically made to a default "chrome provider" server computer that is one of the server computers 106. For example, if the browser program 300 is one provided by Netscape Communications Corporation, then connection would be automatically made to a "chrome provider" web server controlled by Netscape Communications Corporation. In one embodiment, the "chrome provider" web site (or server—these terms are used interchangeably) attains knowledge of the user's demographics (e.g., by asking or from identification information available to it either from registration or on the client computer 104) and provides a particular chrome specification that corresponds to those demographics. For example, a particular chrome specification may be provided that corresponds to a language that the user understands. As another example, the demographic may be determined from information stored on the server computer 106 corresponding to the user, such as a record of buying behavior of a user at an online shopping site.

In addition, other content providers may take advantage of the chrome configuration feature of the browser program 300 such that, when a client computer 104 executing the browser program 300 connects to the server computer 106 providing that content, the server 106 provides a chrome specification that corresponds to that content. For example, a stock information web site may be configured such that its server 106 provides a particular chrome specification to a client computer 104 corresponding to stock information. As one specific illustrative example, the server computer 106 may provide chrome specification that, when processed and loaded into a record 308 of the chrome configuration database 306, results in a "$"-shaped button being generated in the chrome portion 204 of the browser display window 200. As discussed above, the chrome specification for the "$"-shaped button received from the server 106 may also have associated with it particular behavior that would result when a user activates the "$"-shaped button.

In a further embodiment, the chrome provider is a "related information" provider. In accordance with this further embodiment, a "related information" server indication database 307 is provided (either at the client computer 104 as shown in FIG. 3 or at one of the server computers 106). For content displayed on the content portion 202 of the browser window 200, the browser (see block 309 in FIG. 3) provides an indication of that content to the "related information" servers indicated in the "related information" database 307. In response to the content indication provided by the browser program 300, software executing on the "related information" servers provides "related information" back to the browser 300 for the chrome configuration process 310 to store into the chrome configuration database 306 as chrome specifiers. As a result of the chrome configuration database 306 including the "related information" as chrome specifiers, the chrome display and action program 304 causes the "related information" to be displayed as a part of the chrome portion 204.

One example of the "content indication" includes the URL of the site for which content is being displayed in the content portion 202. Another example of the "content indication" includes keywords entered by a user to a "smart keywords" feature of the browser 300, where the "smart keywords" feature is utilized by the browser to obtain a URL. Examples of the "related information" include, but are not limited to, reviews of the web site, other web sites (i.e., links thereto) that have content on related topics, reviews of the web site, or other types of information as provided, for example, by the Alexa Internet product discussed above. Significantly, by providing "related information" from multiple sites, multiple competing points of view can be provided to the user.

The send module 309 may also provide an indication to the "related information" servers of a demographic of the user. This demographic indication may be determined, for example, from a cookie file on the client computer 104 or from identity preference information defined by the user and stored on the client computer, e.g. during installation and setup of the browser program 100 on the client computer 104. The "related information" server computer 106 may then use the demographic information to provide "related information" that is focused to that particular user. In some cases, the demographic information sent by the send module 309 may consist only of identity information, and the "related information" server includes functionality to match the identify information to demographic information accessible by the server computer 106. For example, the server computer 106 may be a web retail site from which the user has previously made purchases of which the web retail site has a record. In fact, the web retail site (or other sites) may provide to the client computer 104 (specifically, the "related information" server database 307) an indication of itself as a "related information" server in a manner similar to that discussed above with respect to chrome configuration specifiers.

Furthermore, in preferred embodiments, the "related information" server indication database is dynamically reconfigurable in order to further enhance the reliability of the points of view provided. (This is so whether "related information" is being received from just one, or from more than one, "related information" server.) That is, in a manner similar to the manner in which the chrome is dynamically reconfigured, the "related information" server indications are also dynamically reconfigurable. For example, as discussed above relative to chrome specifiers, the "related information" server indications may be provided to the "related information" server indication database by downloading an RDF file from a server computer (which may or may not be one of the "related information" servers) 106, wherein the chrome configuration program module 310 (or another program module provided expressly for this purpose) processes the downloaded RDF file to populate the "related information" server indication database 307.

It is intended that the following claims define the scope of the invention and that methods and apparatus within the scope of these claims and their equivalents be covered thereby.

Attached hereto as Appendix A is an engineering specification entitled "Configurable Chrome (Cthulhu)" which is to be considered an integral part of this specification.

Attached hereto as Appendix B is portions (sixty one modules) of browser source code to implement modifiable chrome.

Attached hereto as Appendix C is source code to implement the 10 related information provider feature.

Appendices A, B, and C were submitted with U.S. patent application Ser. No. 09/208,805, filed Dec. 9, 1998, and are incorporated by reference in this application in their entirety.

What is claimed is:

1. A method, comprising:
receiving, at a content provider system which includes one or more processors and which is associated with a content provider, a request, from a user device, for content offered by the content provider, the request identifying content that has been requested to be displayed at a content portion of a browser at the user device;
based on receiving the request for content offered by the content provider, accessing, at the content provider system, chrome specification information defining a chrome appearance and a chrome behavior of a control element configured to be displayed at a chrome portion of the browser at the user device and configured to invoke functionality of the content provider that is related to the content that has been requested to be displayed at the content portion of the browser at the user device; and
sending, from the content provider system to the user device, the chrome specification information defining the chrome appearance and chrome behavior of the control element, receipt of the chrome specification information by the user device triggering the user device to display the control element at the chrome portion of the browser at the user device based on the chrome specification information, the control element being displayed at the chrome portion of the browser along with one or more other control elements corresponding to one or more other content providers that are also configured to invoke functionality that is related to the content that has been requested to be displayed at the content portion of the browser at the user device.

2. The method of claim 1 wherein the chrome specification comprises information associated with a third-party website.

3. The method of claim 1 wherein the request identifying content that has been requested to be displayed at a content portion of a browser at the user device indicates the user device navigating to a web site hosted by the content provider.

4. The method of claim 1 wherein receipt of the chrome specification information by the user device triggers the user device to remove an existing chrome element and to replace the existing chrome element with the control element that is configured invoke functionality of the content provider that is related to the content that has been requested to be displayed at the content portion of the browser at the user device.

5. The method of claim 1 wherein sending, from the content provider system to the user device, the chrome specification information includes transmitting the chrome specification information from the content provider system to the user device over a network.

6. The method of claim 1 wherein accessing, at the content provider system, chrome specification information defining the chrome appearance and chrome behavior of the control element includes:
identifying a user associated with the user device; and
selecting, at the content provider system, chrome specification information based on the user associated with the user device.

7. The method of claim 6 wherein selecting, at the content provider system, chrome specification information based on the user associated with the user device includes:
accessing demographic information related to the user; and
selecting, at the content provider system, chrome specification information based on the demographic information related to the user.

8. The method of claim 6 wherein selecting, at the content provider system, chrome specification information based on the user associated with the user device includes:
accessing information related to past interaction of the user with the content provider system associated with the content provider; and
selecting, at the content provider system, chrome specification information based on the past interaction of the user with the content provider system associated with the content provider.

9. The method of claim 1 wherein sending, from the content provider system to the user device, the chrome specification information includes sending, from the content provider system to the user device, the chrome specification information and the content offered by the content provider.

10. The method of claim 1 wherein receipt of the chrome specification information by the user device also triggers the user device to store the chrome specification information as a record in a chrome configuration database at the user device along with one or more other records corresponding to other chrome specification information from the one or more other content providers, the other chrome specification information defining the one or more other control elements.

11. A content provider system associated with a content provider, the content provider system comprising a processor and a tangible memory that stores executable instructions that, when executed by the processor, cause the content provider system to:
- receive a request, from a user device, for content offered by the content provider, the request identifying content that has been requested to be displayed at a content portion of a browser at the user device;
- based on receiving the request for content offered by the content provider, access chrome specification information defining a chrome appearance and a chrome behavior of a control element configured to be displayed at a chrome portion of the browser at the user device and configured to invoke functionality of the content provider that is related to the content that has been requested to be displayed at the content portion of the browser at the user device; and
- send, to the user device, the chrome specification information defining the chrome appearance and chrome behavior of the control element, receipt of the chrome specification information by the user device triggering the user device to display the control element at the chrome portion of the browser at the user device based on the chrome specification information, the control element being displayed at the chrome portion of the browser along with one or more other control elements corresponding to one or more other content providers that are also configured to invoke functionality that is related to the content that has been requested to be displayed at the content portion of the browser at the user device.

12. A method, comprising:
- establishing, over a network and by a server associated with a content provider, a connection with a user device;
- accessing, by the server associated with the content provider, chrome specification information defining a chrome appearance and a chrome behavior of a control element configured to be displayed at a chrome portion of the browser at the user device and configured to invoke functionality of the content provider that is related to content that has been requested to be displayed at the content portion of the browser at the user device; and
- providing, over the connection established between the server associated with the content provider and the user device, the chrome specification information defining the chrome appearance and chrome behavior of the control element, receipt of the chrome specification information by the user device triggering the user device to display the control element at the chrome portion of the browser at the user device based on the chrome specification information, the control element being displayed at the chrome portion of the browser along with one or more other control elements corresponding to one or more other content providers that are also configured to invoke functionality that is related to the content that has been requested to be displayed at the content portion of the browser at the user device.

13. The method of claim 12 wherein the chrome specification comprises information associated with a third-party website.

14. The method of claim 12 wherein accessing, by the server associated with the content provider, chrome specification information defining the chrome appearance and chrome behavior of the control element includes:
- identifying a user associated with the user device; and
- selecting, at the server associated with the content provider, chrome specification information based on the user associated with the user device.

15. The method of claim 14 wherein selecting, at the server associated with the content provider, chrome specification information based on the user associated with the user device includes:
- accessing demographic information related to the user; and
- selecting, at the server associated with the content provider, chrome specification information based on the demographic information related to the user.

16. The method of claim 14 wherein selecting, at the server associated with the content provider, chrome specification information based on the user associated with the user device includes:
- accessing information related to past interaction of the user with the content provider; and
- selecting, at the server associated with the content provider, chrome specification information based on the past interaction of the user with the content provider.

17. The method of claim 12 wherein providing, over the connection established between the server associated with the content provider and the user device, the chrome specification information includes providing, over the connection established between the server associated with the content provider and the user device, the chrome specification information and the content offered by the content provider.

18. A server associated with a content provider, the server comprising a processor and a tangible memory that stores executable instructions that, when executed by the processor, cause the server to:
- establish, over a network, a connection with a user device;
- access chrome specification information defining chrome characteristics of a control element configured to be displayed at a chrome portion of the browser at the user device and configured to invoke functionality of the content provider that is related to content that has been requested to be displayed at the content portion of the browser at the user device; and
- provide, over the connection established with the user device, the chrome specification information defining the chrome characteristics of the control element, receipt of the chrome specification information by the user device triggering the user device to display the control element at the chrome portion of the browser at the user device based on the chrome specification information, the control element being displayed at the chrome portion of the browser along with one or more other control elements corresponding to one or more other content providers that are also configured to invoke functionality that is related to the content that has been requested to be displayed at the content portion of the browser at the user device.

* * * * *